May 5, 1959          J. P. RASOR          2,885,636

ELECTRICAL TESTING DEVICE AND METHOD

Filed Sept. 24, 1953          4 Sheets—Sheet 1

JOHN P. RASOR,
INVENTOR.

BY
ATTORNEY.

May 5, 1959

J. P. RASOR 2,885,636

ELECTRICAL TESTING DEVICE AND METHOD

Filed Sept. 24, 1953

JOHN P. RASOR,
INVENTOR.

BY

ATTORNEY.

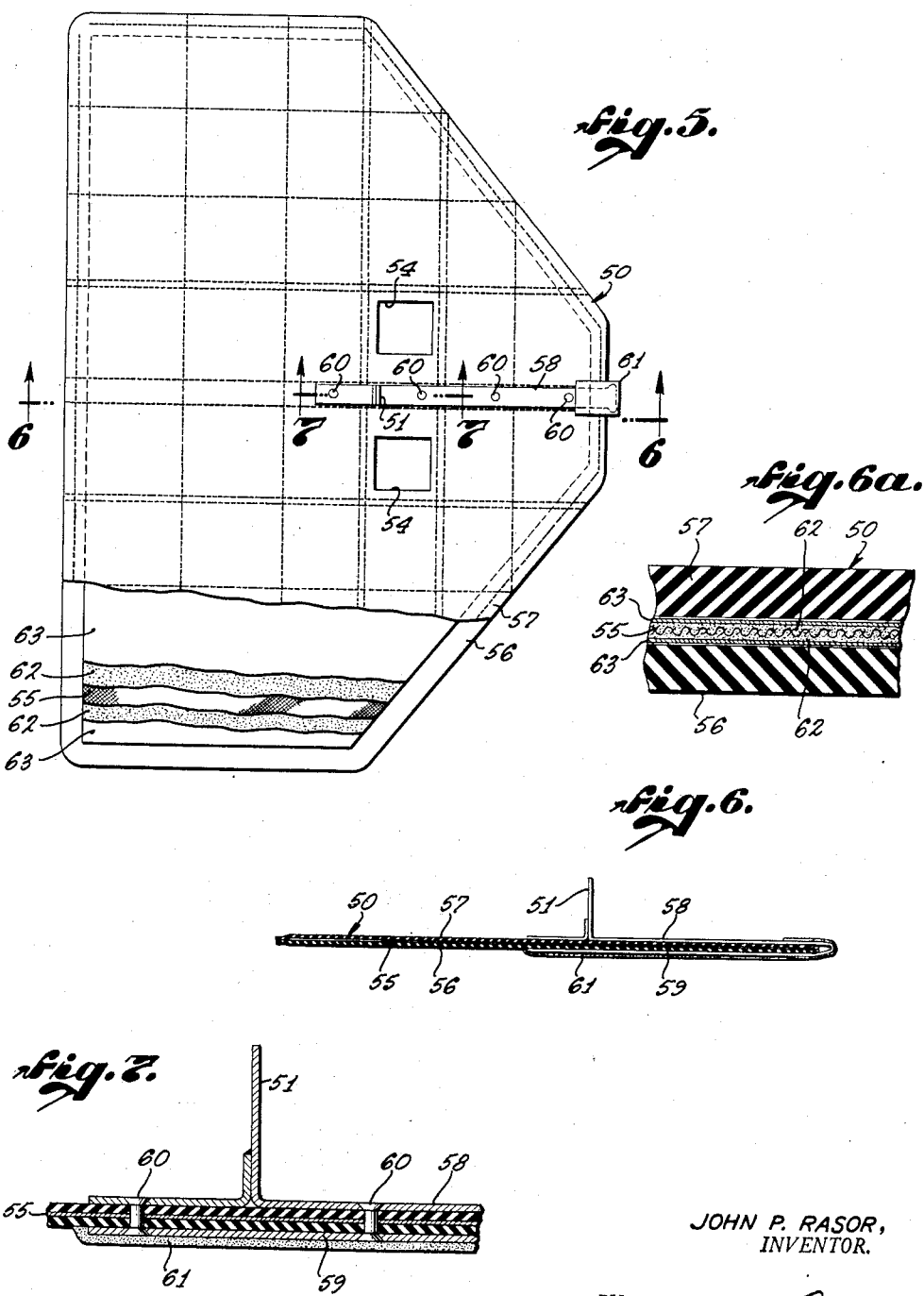

May 5, 1959 J. P. RASOR 2,885,636
ELECTRICAL TESTING DEVICE AND METHOD
Filed Sept. 24, 1953 4 Sheets-Sheet 4
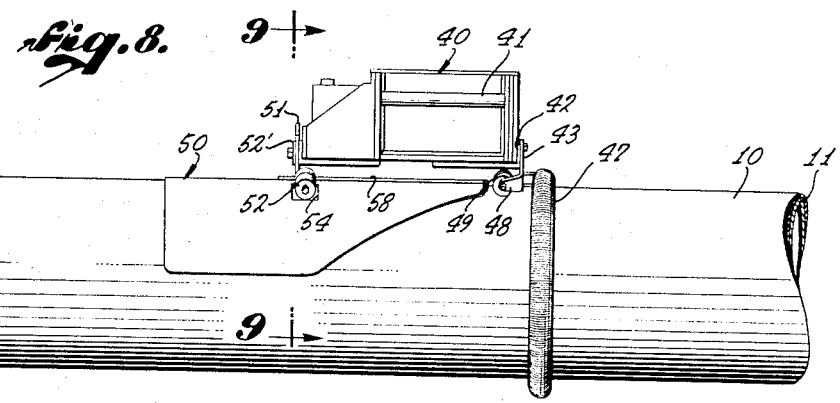
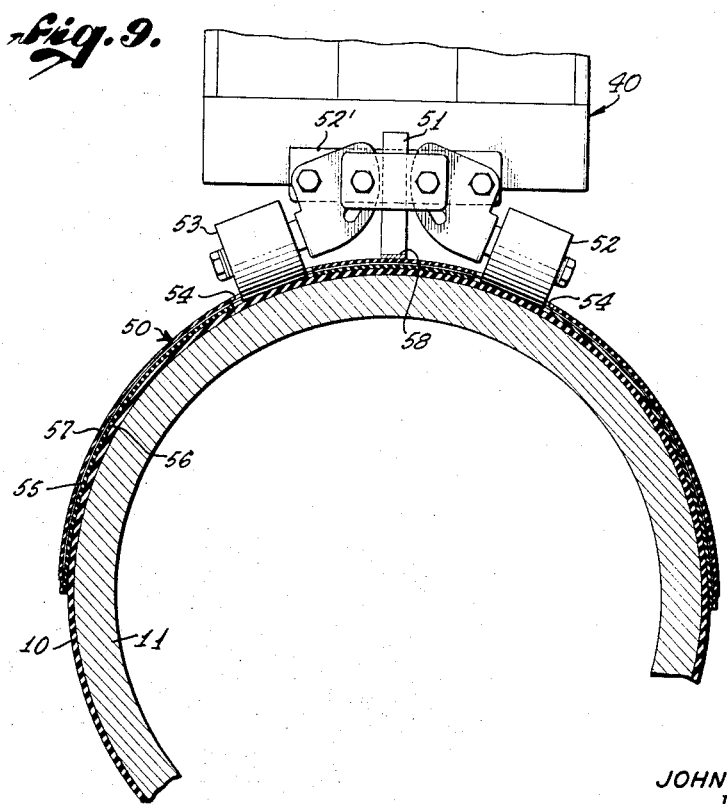
JOHN P. RASOR,
INVENTOR.
BY
ATTORNEY.

United States Patent Office 2,885,636
Patented May 5, 1959

2,885,636

ELECTRICAL TESTING DEVICE AND METHOD

John P. Rasor, San Gabriel, Calif., assignor to Tinker and Rasor, San Gabriel, Calif., a corporation of California Application September 24, 1953, Serial No. 382,135

15 Claims. (Cl. 324—54)

This invention relates to electrical flaw detection in dielectric non-conducting material covering an electrical conducting material.

It more particularly relates to an electrical apparatus and method for detecting flaws in a dielectric non-conducting material covering a conducting material, especially where the dielectric material covers the conducting material in such a way that the conducting material thus covered is not accessible, or is not readily accessible, for electrical contact for applying a test voltage across the dielectric material between the conducting material and the opposite side of the dielectric material.

Although the invention is widely applicable for this general purpose, it is especially suitably embodied as a device and method for inspecting a protective layer or coating of dielectric non-conducting material encasing a metal pipe, such as, for example, a pipe to be placed underground for the transmission of a fluid, such as natural gas or liquid petroleum products, across country. Such an embodiment of the invention will be described herein for the purpose of disclosure and to illustrate the invention and also to afford adequate guidance and teaching so that those skilled in the art may readily apply the invention to other specific purposes in other fields.

Such pipe to be inspected is made usually of steel and is coated with a protective layer of suitable non-conducting dielectric material, such as asphalt or tar, which is usually encased by an additional outer wrapper of felt or kraft paper. The purpose of the test procedure is to reveal any flaws that may exist in the protective material encasing the pipe and especially flaws in the form of tiny holes in the protective coating material. Such flaws usually consist of very small pinholes commonly referred to as "holidays," through which an electric spark will jump when high voltage is applied across the dielectric non-conducting coating material between the metal of the pipe and a test electrode on the opposite face of the dielectric non-conducting coating material.

A well known apparatus for detecting holidays in such coated pipe is illustrated in Patents Nos. 2,332,182 and 2,615,077. Such an apparatus comprises essentially a high voltage electrical generator, and an exploring electrode connected to one terminal of this generator, which electrode is adapted to be used as a probe for exploring the outer surface of the coating with the high voltage in testing for holidays. The other terminal of the generator is usually connected to a trailing ground wire which electrically connects with ground, and, through ground, the electrical connection is made to the metal of the pipe so that the high test voltage is applied across the coating material between the probe and the metal of the pipe. With such an arrangement, the varying or alternating current flowing in the test circuit, which current supplies the test voltage, at the point of test, must flow through the metal of the pipe to ground, through the earth, through the ground wire and back to the generator, and also, when a holiday is encountered by the probe, a spark jumps between the probe and the metal of the pipe through the holiday pinhole in the coating and the current passes through this same circuit including the earth. In locations where the earth is normally very dry, it is very difficult for the current to pass through the dry earth to the ground wire, and this difficulty results in poor test voltage regulation across the coating between the probe and the metal of the pipe, thus producing an undesirable and large variation in test voltage at the important point of test in the electrical test circuit, namely, across the coating material between the probe and the metal of the pipe.

This condition exists to a great and disadvantageous degree especially when a pulse or alternating type generator is used to supply the high voltage, because, when the test voltage is of alternating or pulse type, a relatively large current flow is required in the test circuit to maintain at all times the proper test voltage at the test point between the probe and the metal of the pipe. The presence of the dry earth of high resistance in the circuit impedes this needed flow of current in the test circuit to the extent of the high resistance of the dry earth to thus undesirably lower the test voltage at the probe. Not only does this undesirably reduce the test voltage but also, since the resistance of the earth varies in an unknown manner, the test voltage across the coating material between the probe and the metal of the pipe fluctuates correspondingly, thus producing undesirable test conditions, Moreover, in some situations it is very often impossible to make a connection between the metal of the pipe and ground so that it is not possible to electrically connect the test voltage to the metal of the pipe covered by the coating material.

It should be noted that such ground resistance in the test circuit is not a problem as described above in such a test system as disclosed in my Patent No. 2,650,346, in which a non-pulsating direct current voltage is applied at the test point across the coating between the probe and the metal of the pipe and the electrical charge for the spark caused to jump through the holidays is supplied from the condenser comprising probe, dielectric coating material and metal of the pipe. In this arrangement, the current for the spark does not have to flow through the whole circuit, including the ground, but only through the holiday between the probe and the metal of the pipe, as this condenser, comprising probe, dielectric coating and pipe metal, is discharged through the holiday as a spark. However, there are limitation to the use of such a high potential non-pulsating direct current test voltage in the field, and there are many uses where pulsating or alternating test voltage must be used.

In accordance with my invention, I have discovered not only the reasons why prior electrical test systems involving pulsating or varying test voltage, such as alternating current, are exceedingly deficient, as pointed out above, but also that these deficiences can be eliminated in accordance with my new apparatus and method in which high varying voltage supplied by the power source can be applied at constant voltage at the test point across the coating material between probe and metal of the pipe and can be returned to the power source to make a complete electrical circuit without a ground wire, without passing the return current through the earth, and without making direct physical electrical contact with the metal of the pipe covered by the coating. In accordance with my invention, I have discovered that this can be done by forming a second condenser with a portion of the coating material as the dielectric and a portion of the metal of the pipe as one plate of such condenser, preferably by applying a second probe to an area of the coating material to form said second condenser, comprising the second probe, portion of the dielectric coating material, and metal of the pipe, in addition to the first condenser formed by the test probe, dielectric material, and metal of the pipe, and electrically connecting said second probe to the return terminal of the power source so that said first condenser and said second condenser constitute two condensers in series in the test circuit, interconnected by the metal of the pipe.

Although I am not to be limited by any mere theoretical explanation, I believe that with this arrangement the varying current in the complete test circuit is maintained constant, particularly because of the lack of an unknown fluctuating resistance, such as earth of varying dryness, so that the test voltage in the test condenser, that is, the test voltage across the coating material between the test probe and the metal of the pipe, remains constant as the testing operating proceeds.

I have also discovered that the test voltage across the first condenser can be made sufficiently greater than the voltage across the second condenser so that preferably a spark will jump only at the first condenser which constitutes the test condenser upon encountering a holiday in the coating material, by making the capacity of the second or coupling condenser sufficiently greater than the capacity of the test condenser. This may be most easily done by making the area of the second test probe covering the coating material sufficiently larger than the area of the first and test probe. It is an important discovery in accordance with my invention that preferably the capacity of the coupling condenser should be greater than about two times the capacity of the test condenser, and for the best results in this respect, greater than about four times, so that not only is there a higher test voltage on the test condenser, but also I have discovered that, with this condition of having the capacity of the coupling condenser thus much greater than that of the test condenser, variations in the capacity of the coupling condenser have only a very minor effect on the voltage of the test condenser during use.

It will be apparent to those skilled in the art that the desired relatively high capacitance on the part of the second capacitor that replaces the ground wire may be achieved in various ways in various practices of the invention. For example, the second capacitor may have a relatively large effective plate area and for this purpose may comprise a plurality of parallel capacitors. Difference in capacitance may also be achieved, at least in part, by difference in spacing across the pairs of plates in the two capacitors respectively.

A further advantage of my invention is that in addition to the important ones referred to above, it eliminates the attending difficulties in detaching and reattaching a ground wire to clear it of obstacles, such as trees, stones, etc., while the testing apparatus is being moved along a pipe line in rough country during the testing operation. A still further and important advantage of my invention is that the desired effective testing to cause a spark to jump to reveal holidays can be accomplished at a relatively lower consumption of energy from the power source, which is especially important where out in the open country a small battery must be used as the source of energy for testing.

Accordingly, it is an object of my invention to provide a method and apparatus as described which will with a varying voltage source maintain a constant voltage at the test electrode.

It is another object of my invention to provide a method and apparatus which will eliminate the mechanical deficiencies inherent in trailing a ground wire adjacent the pipe line being tested.

Another object of my invention is to provide an apparatus, all the electrical parts of which are arranged in a unitary structure capable of being moved with a unit along the pipe being tested.

A still further object of my invention is to provide a method and apparatus which provides effective electrical testing at a relatively low energy consumption.

A further advantage of my invention is to provide a method and apparatus whereby a change of voltage on the test electrode can be made without changing the terminal voltage of the high voltage generator.

Other important objects and advantages of the invention will be apparent in the following detailed description, considered with the accompanying drawings.

In the drawings, which are to be regarded as merely illustrative,

Fig. 5 shows the second probe of the modification of Fig. 4 for forming the coupling condenser with the coated pipe.

Fig. 6 is a cross-section on the line 6—6 of Fig. 5 of the second probe.

Fig. 6a is a partial cross-section of a modification of the second probe.

Fig. 7 is a detail cross-section on the line 7—7 of Fig. 5 showing the means for electrically connecting the second probe of the coupling condenser to the generator.

Fig. 8 shows somewhat schematically a side view of the modification of Fig. 4 in use on a coated pipe.

Fig. 9 shows a cross-section on the line 9—9 of Fig. 8 particularly to illustrate the electrical connection of the coupling condenser to the generator.

Figure 1:
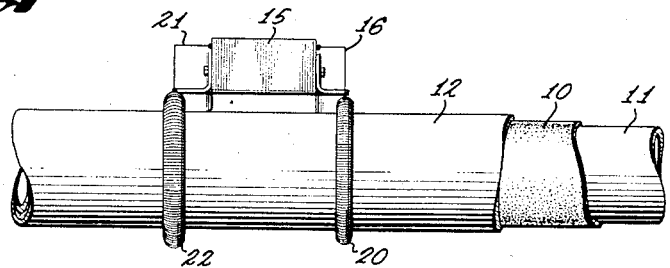
Fig. 1 is a diagrammatic view in side elevation illustrating one embodiment of the invention.

The purpose of the apparatus shown in Fig. 1 is to detect pin holes and other flaws in a protective coating 10 that is bonded to the surface of a metal pipe 11. In many instances, the protective coating 10 is encased by a wrapping or shield 12 of felt, kraft paper or other suitable sheet material.

The test apparatus includes the usual box-like housing 15 which includes a suitable source of current which current may be either in the form of alternating current or in the form of voltage pulses of direct current, voltage pulses being preferred. The voltage source in the housing 15 is connected by a lead 16 to a first conducting means in the form of a suitable test probe or electrode 20. Such a test electrode may, for example, be a helical spring formed into a ring to movably embrace the covered pipe in a manner well known in the art. It is apparent that the electrode 20 cooperates with the metal body of the pipe 11 to form what may be termed a first capacitor, the dielectric of the capacitor including air in addition to a coating 10 and the wrapping 12.

The second side of the voltage source in the housing 15 is connected by a lead 21 to a second conducting means 22 which may be similar in construction to the electrode 20 and forms a second capacitor in cooperation with the pipe 11. The capacitance of the second capacitor formed by conducting means 22 is larger than the capacitance of the first capacitor formed by the electrode 20 so that the higher voltage prevails across the first capacitor and sparking in response to flaws in the protective pipe coating will occur only at the test electrode 20.

The difference in capacitance is achieved by suitable difference in dimensions between the two conducting means. In this instance for example where the two conducting means are of similar coiled-spring construction, the turns of the conducting means 22 are larger in diameter than the turns of the electrode 20.

Figure 2:
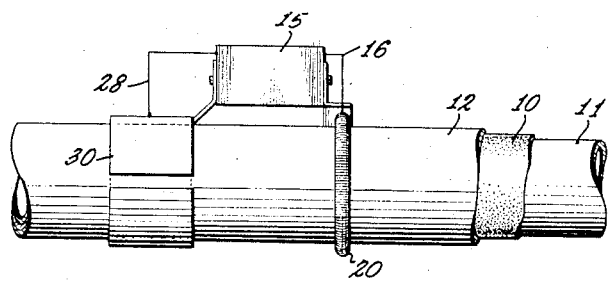
Fig. 2 is a similar view of a second embodiment.

The construction shown in Fig. 2 is, for the most part, similar to the construction shown in Fig. 1 as indicated by the use of corresponding numerals to indicate corresponding parts. In this practice of the invention, the second side of the voltage source in the housing 15 is connected by a wire 28 to a conducting means 30 in the form of a relatively wide band having the configuration of a split ring to loosely embrace the pipe 11. The band 30 serves the same purpose as the relatively large electrode 25 in Fig. 2, the capacitance of the band in conjunction with the pipe 11 being great enough to cause sparking action to occur only at the electrode 20.

Figure 3:
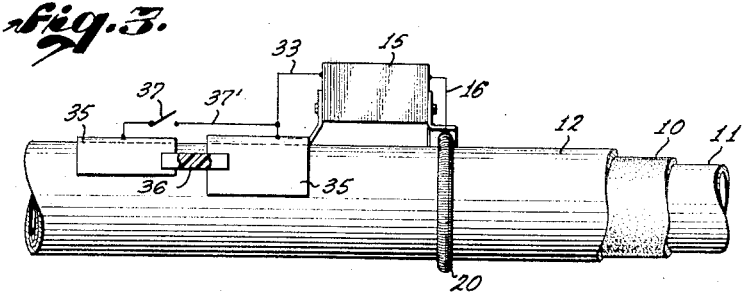
Fig. 3 is a similar view of a third embodiment.

The form of the invention shown in Fig. 3 has the usual test electrode 20 connected by a wire 16 to one side of the voltage source in the housing 15. The other side of the voltage source, however, is connected by a wire 33 to two spaced electrodes 35 which may be identical in size and construction, each being in the form of a semi-cylinder or saddle to move along the pipe. The two electrodes 35 are suitably spaced from each other and are structurally interconnected by bars 36 of non-conducting material to move as a unit. Since the two electrodes 35 are connected in parallel, they form two parallel capacitors on one side of the test circuit, the two capacitors combining to constitute the equivalent of a single capacitor. This composite capacitor has a total capacitance much greater than the capacitance of the test electrode 20. Thus, with respect to concentrating the sparking action at the electrode 20, the arrangement shown in Fig. 3 is the equivalent of the arrangement shown in Figs. 1 and 2.

A feature of the arrangement shown in Fig. 3 is that rear electrode 35 is connected to the other electrode 35 by a wire 37' and a switch 37. When the device is in use, switch 37 may be either normally closed or normally open. If normally closed, switch 37 may be opened for the purpose of reducing the potential across the test electrode 20. If normally open, the switch may be closed to increase the potential at the test electrode. This mode of potential adjustment at the test elecrode is based on the previously mentioned fact that the voltage distribution is inverse to the capacitance distribution when capacitors are in series.

Figure 4:
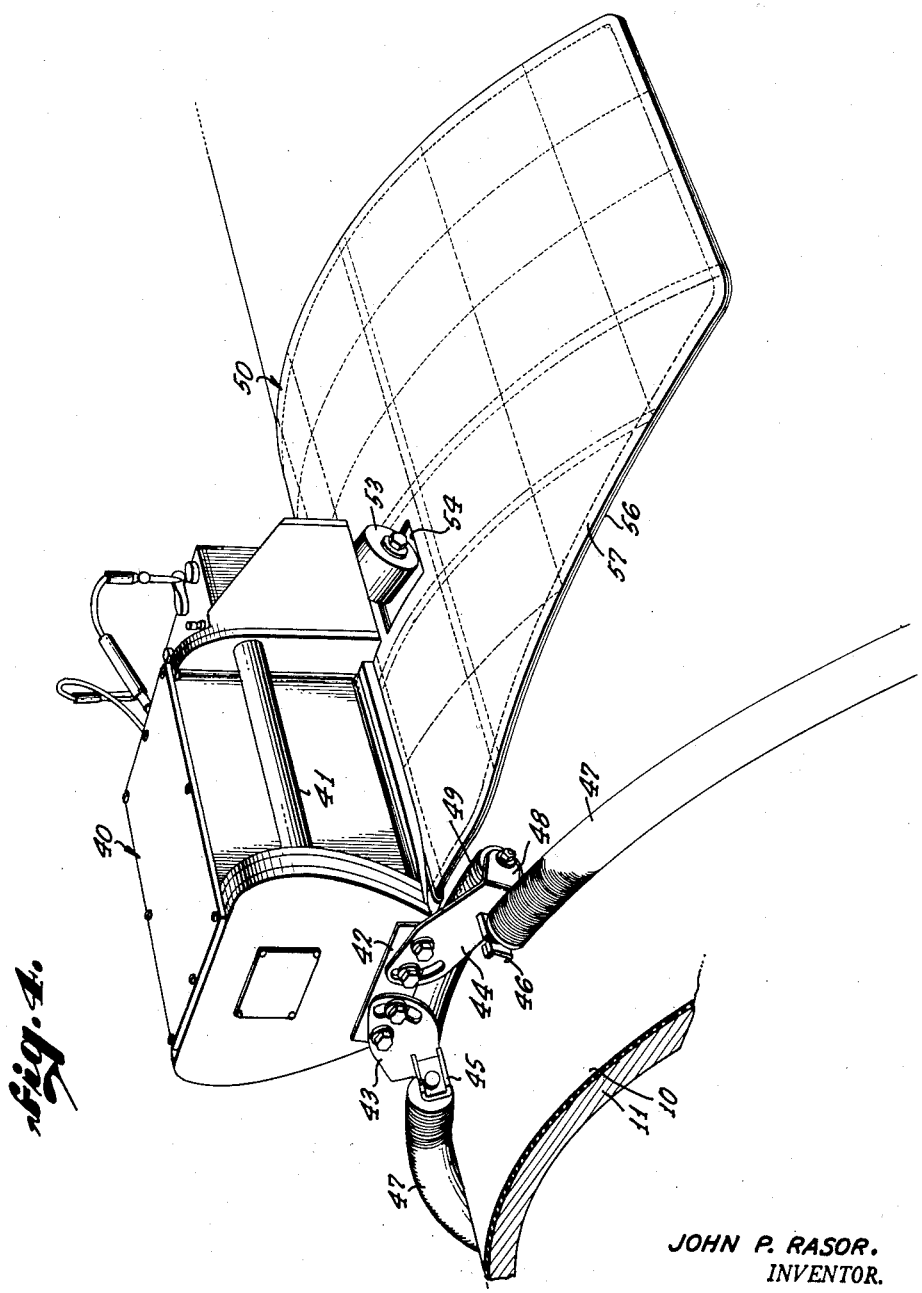
Fig. 4 is a perspective view of a modification of my invention shown in use on a large coated pipe.

In Figs. 4 to 9 is shown a modification of apparatus in accordance with my invention especially adapted for use in connection with testing relatively large diameter pipe and having a specially adapted flexible and relatively large coupling condenser plate 50. In Figs. 4, 8 and 9, shown generally at 40 is a housing which contains means for a suitable source of pulsating or alternating high voltage test current. This housing has a handle 41 by which it may be moved along the top of the pipe by the operator. At the front end of the housing is plate 42 which constitutes one of the two electrical terminals of the high voltage generator to which are attached two depending brackets 43 and 44 carrying horizontal extending members 45 and 46 to which both the ends of long spring 47 extending around the entire circumference of pipe are rotatably attached, respectively, so that, as the testing device is moved along the pipe, the spring will roll along in contact with the coating and apply the test voltage thereto. Depending brackets 43 and 44 each have backwardly projecting elements as shown for bracket 44 at 48, to each of which the ends of a spring 49 are rotatively affixed so that spring 49 will rotate in the region between members 45 and 46 not covered by long spring 47 to thus provide electrode coverage extending completely around the circumference of the pipe. Springs 47 and 49 thus provide the test electrode, which, in conjunction with the dielectric coating material and the metal of the pipe underneath these two springs, constitutes what is referred to herein as the test condenser across which the test voltage is applied for detecting holidays.

Affixed to the back end of housing 40 is a large flexible condenser plate 50 which is electrically connected to the other terminal of the high voltage generator at the back end of housing 40 by upwardly extending contact member 51 which is in electrical contact with metal terminal 52'. It will be seen that coupling condenser plate 50 occupies a relatively large area compared to the area of springs 47 and 49 and extends not only to some considerable extent under the housing 40 but in back of the housing 40 and also downwardly and flexibly over each side of the pipe to the extent of about 180°. The front end of housing 40 is supported and rolls on rolling springs 47 and 49, and the back end of the housing is supported by rollers 52 and 53 suitably supported to the bottom of the housing as shown. Holes 54 are provided in the flexible coupling condenser plate 50 to accommodate the rollers 53 and 52 so that they will roll on the top of the coated pipe. Rollers 52 and 53 are preferably rubber rollers as known in the art.

In this preferred embodiment in accordance with my invention, the flexible coupling condenser plate comprises a flexible inner layer of canvas sprayed with aluminum metal shown at 55, insulated on each side, that is, on both the top and bottom side, with a layer of rubber 56, preferably neoprene, on the bottom side and 57 on the top side. Thus the flexible canvas 55 sprayed with aluminum constitutes a flexible electrical conductor sheet encased with rubber insulation so that the entire structure 50 when lying flat against the coated pipe forms a condenser with the metal of the pipe and coating material therebetween. It will be understood that the coupling condenser formed by coupling condenser plate 50 and the test condenser formed by springs 47 and 49 are connected in series by the metal of the pipe between these springs and the coupling condenser plate. Thus these two condensers constitute a pair of condensers in series with the two terminals of the high voltage electrical generator.

In order to mechanically and electrically connect the coupling condenser 50 to the upwardly extending member 51, which as pointed out above is connected to the back end of housing 40, two narrow metal strips 58 and 59 are provided centrally of the coupling condenser plate 50, held together by rivets 60, which also contact the sprayed aluminum metal on 55 to provide electrical contact to the sprayed aluminum metal. As shown in Fig. 7, the rubber insulation 56 may be extended down to cover the bottom of narrow metal strips 58 and 59 as shown at 61 to provide electrical insulation.

Thus it will be seen that, in accordance with this modification, housing 40, by grasping handle 41 may be moved forward, along the pipe on rolling springs 47 and 49 and rollers 52 and 53 while applying high pulse or alternating test voltage by the springs 47 and 49, with the coupling condenser in series completing the circuit to the power source in such a manner that the voltage at the test condenser is many times higher than the voltage at the coupling condenser so that sparks are caused to jump through holidays only at the test condenser. For example, a test voltage from the power source may be supplied at about 15,000 volts, alternating current, with the voltage of the test condenser about 12,000 volts.

In making the canvas sprayed with a uniform layer of aluminum metal, it is preferable to first coat the canvas with a thin film of a polyester resin 62 and then spray on the aluminum 63. This has been found to provide the most satisfactory material to be used for carrying the sprayed aluminum metal. A polyester resin found satisfactory for this purpose is known in the art as Selectron 5081. The aluminum is sprayed by a process known as metallizing. In metallizing, molten metal is sprayed onto a properly prepared surface by any one of several methods. In the most widely applied method, metal in wire form is passed through a gas flame and melted, and the molten metal is sprayed onto the surface to be coated by means of an air jet. Deposition of metal in this fashion is basically a mechanical interlocking of microscopically fine particles.

Although the arrangement described above for a coupling condenser is preferred, it will be understood, of course, that especially from the electrical point of view the coupling condenser in the electrical system of my invention can be made of any suitable sheet of metal conducting material. Of course, it will be preferable to insulate as indicated above. For example, a thin sheet of flexible metal such as aluminum foil may be used, preferably between two sheets of neoprene rubber.

Each of the described practices of the invention completely eliminates ground resistance and not only relieves the operator of the task of continually checking on the usual trailing ground wire but also relieves the operator of the task of making a ground connection for the metal pipe to complete the test circuit. It is to be noted that in all practices of the invention substantially the same dielectric material is involved in both capacitors of the test circuit. Practically the only variable affecting the test circuit is the presence of pin holes or other small scale flaws in the protective coating in the region of the electrode. It is also apparent that the desired relation in capacitance between the two capacitors of the test circuit is maintained as the device is applied to different pipes having protective coatings differing in thickness and/or delectric property.

My invention is especially useful in conjunction with a pulse generator which supplies direct current pulses at a frequency of 40 cycles per second in which the pulses have a very sharp, high power wave form such that, with the voltage plotted with time, the base of the pulse is about 30 microseconds wide. With a system using such a generator, the two condensers, that is, the testing condenser and the coupling condenser, provide a path for high instantaneous current flow, which current flow will maintain constant voltage at the test electrode. In the conventional testing method where a tailing ground wire is used the resistance of the ground return varies continuously, which limits the amount of power current to flow and causes a continuous change of voltage at the test electrode. Also, the arrangement in accordance with my invention provides a constant test voltage at the test electrode. It will be noted in accordance with the description above that my invention provides a system where high current is allowed to flow to the test condenser to supply the test voltage and with the power at high peak power.

My description of preferred practices of the invention for the purpose of disclosure will suggest to those skilled in the art various changes, substitutions and other departures that properly lie within the scope and spirit of the appended claims.

This application is a continuation-in-part of my copending application, Serial No. 302,324, filed August 2, 1952.

Having described my inventoin, I claim:

1. In a device for electrically testing a coating of dielectric material on a conducting material, where the conducting material is so covered by the coating material that the conducting material is not accessible for direct electrical contact therewith, the combination consisting of a source of a high varying test voltage having two supply terminals, first means shaped for applying high test voltage to a portion of said coating material and forming a first condenser with said coating material as the dielectric and said means and a portion of said conductor as the two plates of the condenser, second means on one side of said first means shaped for forming a second condenser with another portion of said coating material as the dielectric and another portion of said conductor as a plate of said condenser, and means for electrically connecting said first means and said second means to said two terminals, respectively, of said source of high voltage, said two condensers constituting a pair of condensers in series interconnected by said conducting material, and the capacity of said second condenser being sufficiently greater than the capacity of said first condenser so that the test voltage across said first condenser is sufficiently higher than the voltage across said second condenser that the high voltage required for testing is present only at said first condenser.

2. In a device for testing a metal pipe coated with a dielectric material for holidays, the combination comprising a carriage for a high voltage generator adapted to be rolled along the top of a coated pipe having a test condenser electrode connected to one terminal of said high voltage generator and a coupling condenser plate connected to the other terminal of said high voltage generator, said electrode and plate adapted to move along the surface of said coated pipe as a unit with said carriage to form two condensers in series with the coated metal pipe.

3. In a testing device of the character described for detecting flaws in a layer of non-conducting material on a body of conducting material, the combination of: a source of periodically varying voltage; a first conducting means connected to one side of said source for positioning adjacent said non-conducting layer to form a first capacitor in conjunction with said body; and a plurality of second conducting means connected in parallel to the other side of said source for positioning adjacent said non-conducting layer to form a plurality of capacitors in conjunction with said body whereby said body cooperates with said source and all of said conducting means to form a test circuit having a single capacitor on one side of the circuit and a plurality of capacitors in parallel on the other side of the circuit, the combined capacitance of the plurality of capacitors exceeding the capacitance of the single capacitor so that sparking action in response to flaws in said non-conducting layers occurs at the first capacitor only.

4. In a high voltage spark testing device of the character described for detecting flaws in non-conducting material covering a pipe in which a spark is caused to jump through the flaws from a test electrode applied to one surface of the non-conducting material to the metal of the pipe on the other surface of the non-conducting material, the combination of: a source of periodically varying voltage; a first curved conducting means connected to one side of said source for positioning adjacent said nonconducing layer to form a test electrode and a first capacitor in conjunction with said pipe; and a second curved conducting means connected to the other side of said source for positioning adjacent said nonconducting layer to form a second capacitor in conjunction with said pipe whereby said pipe cooperates with said source and said conducting means to form a test circuit having two capacitors in series, the capacitance of the said second capacitor exceeding the capacitance of said first capacitor so that sparking action in response to flaws in said non-conducting material covering said pipe occurs only at said first capacitor whereby a flaw in said non-conducting layer will be revealed by sparking only across said first capacitor when said first capacitor is in the region of the flaw.

5. In a device of the character described for detecting flaws in non-conducting material covering a pipe, the combination of: a source of periodically varying voltage; a test electrode connected to one side of said source for positioning adjacent said non-conducting layer to form a first capacitor in conjunction with said pipe; and conducting means connected to the other side of said source to form capacitance in conjunction with said pipe of sufficiently greater capacitance than said first capacitor to cause a spark to jump through flaws only at said first capacitor whereby said pipe cooperates with said source to form a complete test circuit with relatively high voltage at said electrode to reveal flaws in said non-conducting layer by sparking action only at the electrode.

6. In a testing device as set forth in claim 5 in which said second capacitor has at least twice the capacity of said first capacitor.

7. A device as set forth in claim 5 in which said capacitance on the second side of the source is formed by a plurality of conducting means connected in parallel to form in cooperation with said pipe a corresponding plurality of parallel capacitors.

8. A device as set forth in claim 4 in which at least one of said two conducting means is in the form of a helical spring forming a ring to surround said pipe.

9. A device as set forth in claim 8 in which both said conducting means are of the same form.

10. A device as set forth in claim 9 in which the helical coils of the second conducting means are of larger diameter than the helical coils of the first conducting means.

11. In a testing device of the character described for detecting flaws in a layer of non-conducting material on a body of conducting material, the combination of: a source of periodically varying voltage; a test electrode connected to one side of said source for positioning adjacent said non-conducting layer to form a first capacitor in conjunction with said body; a plurality of conducting means to form a plurality of capacitors in conjunction with said body; and means including switch means to connect the other side of said source with said plurality of capacitors, with the plurality of capacitors in parallel, said switch means being adjustable to vary the number of said plurality of conductors connected to said other side of the source thereby adjustably to vary the potential across the capacitor formed by said test electrode.

12. The method of testing an electrical non-conducting di-electric material covering an electrical conductor material for small holes through which a spark may be caused to jump by the application of a high voltage across the non-conducting di-electric material, which comprises applying a periodically varying high test voltage across a portion of said non-conducting di-electric material between a test electrode on a portion of one side of said non-conducting di-electric material and said conducting material on the other side of said non-conducting di-electric material, said voltage being sufficiently high to cause a spark to jump through a hole in said non-conducting di-electric material, said test electrode, said portion of conducting material and said non-conducting di-electric material therebetween forming a first capacitance, passing the electrical charge of said spark through said conducting material into a second capacitor formed by applying a condensor plate over another portion of said non-conducting di-electric material to form the second capacitor with a portion of the non-conducting di-electric material and another portion of the conducting material, with the capacitance of said second capacitor sufficiently greater than the capacitance of said first capacitor that a spark is caused to jump only at said first capacitor.

13. In a high voltage spark testing device of the character described for detecting flaws in a layer of non-conducting di-electric material on a body of conducting material in which a spark is caused to jump through the flaws from a test electrode applied to one surface of the non-conducting di-electric material to the body of conducting material on the opposite surface of said non-conducting di-electric material, the combination comprising a source of periodically varying high voltage sufficiently high to cause a spark to jump through such flaws, a test electrode for applying high test varying voltage to one side of a portion of said layer of non-conducting di-electric material and for forming a first capacitor with a portion of one area of said body and layer of non-conducting di-electric material, means electrically connecting said test electrode to said source, second means for forming a second capacitor with another area of said layer in which said second means forms one plate of said capacitor, the portion of said layer the di-electric thereof, and a portion of said body thereunder the second plate thereof, the capacity of said second capacitor being greater than the capacity of said first capacitor, third means electrically connecting said second means with said source so that when said test electrode is applied to one portion of said layer and said second means is applied to another portion of said layer, said test electrode, said second means, said portions of said layer and conducting body provide a test circuit with said two capacitors in series, the capacity of said second capacitor being sufficiently greater than the capacity of said first capacitor so that the voltage across said layer of non-conducting di-electric material at said test electrode is sufficiently greater than the voltage across said layer of non-conducting di-electric material at said second capacitor that a spark will jump through a flaw only at the test electrode and not at the second capacitor, so that flaws in said layer of non-conducting di-electric material will be revealed by sparks jumping therethrough only at said test electrode, said periodically varying high voltage being sufficiently high to cause sparks to jump through flaws at said test electrode.

14. A device as set forth in claim 4 in which said test electrode is in the form of a helical coiled spring adapted to extend around said pipe and said second curved conducting means is in the form of a saddle-shaped member adapted to conform to the top of said pipe and form said second capacitor therewith.

15. A method of testing a layer of an electrical non-conducting di-electric material covering an electrical conducting material for small holes through which a spark is caused to jump by the application of a high voltage across said layer to said conducting material, which comprises applying one side of a periodically varying high test voltage circuit to a first portion of said layer and forming a first capacitance between said first portion and the conducting material thereunder, applying the other side of said high test voltage circuit to a second portion of said layer and forming a second and greater capacitance with said second portion and the conducting material thereunder in series with said first lesser capacitance, and applying a sufficiently high varying test voltage to said circuit that sparks jump through holes at said first portion, said second capacitance being sufficiently greater than said first capacitance so that the voltage at said first capacitance is sufficiently greater than the voltage at said second capcitance that a spark will jump through a hole only at said first portion and not at said second portion.

References Cited in the file of this patent

UNITED STATES PATENTS

| | | |
|---|---|---|
| 856,012 | Wolcott | June 4, 1907 |
| 1,567,979 | Frank | Dec. 29, 1925 |
| 1,673,331 | Hess | June 12, 1928 |
| 2,155,840 | Rorden | Apr. 25, 1939 |
| 2,216,559 | Ortlieb et al. | Oct. 1, 1940 |
| 2,297,346 | Crist | Sept. 29, 1942 |
| 2,332,182 | Stearns | Oct. 19, 1943 |
| 2,432,669 | Kliever | Dec. 16, 1947 |
| 2,555,977 | Kline | June 5, 1951 |
| 2,573,815 | Smith | Nov. 6, 1951 |
| 2,576,488 | Stovall et al. | Nov. 27, 1951 |
| 2,629,002 | Tinker | Feb. 17, 1953 |
| 2,663,844 | Earle et al. | Dec. 22, 1953 |
| 2,704,825 | Martin et al. | Mar. 22, 1955 |
| 2,759,144 | Whyman | Aug. 14, 1956 |

FOREIGN PATENTS

| | | |
|---|---|---|
| 416,308 | Great Britain | June 5, 1933 |